Figure 1:
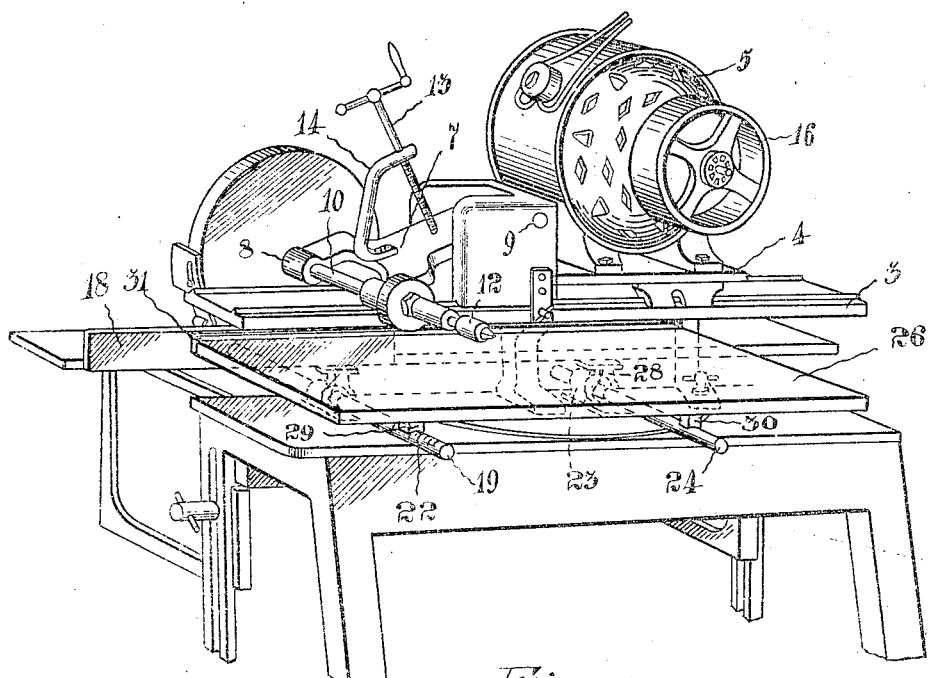

W. A. ELLIOT.
COMBINATION WOODWORKING MACHINE.
APPLICATION FILED JULY 8, 1914.

1,118,116.

Patented Nov. 24, 1914.
2 SHEETS—SHEET 1.

Witnesses.

Inventor.
William A. Elliot
by Stanley Lightfoot
Atty.

W. A. ELLIOT.
COMBINATION WOODWORKING MACHINE.
APPLICATION FILED JULY 8, 1914.

1,118,116.

Patented Nov. 24, 1914.
2 SHEETS—SHEET 2

UNITED STATES PATENT OFFICE.

WILLIAM ALBERT ELLIOT, OF TORONTO, ONTARIO, CANADA.

COMBINATION WOODWORKING-MACHINE.

1,118,116.   Specification of Letters Patent.   Patented Nov. 24, 1914.

Application filed July 8, 1914.   Serial No. 849,767.

*To all whom it may concern:*

Be it known that I, WILLIAM ALBERT ELLIOT, of the city of Toronto, in the county of York, in the Province of Ontario, in the Dominion of Canada, have invented certain new and useful Improvements in Combination Woodworking-Machines, and do hereby declare that the following is a full, clear, and exact description of same.

This invention relates to improvements in combination woodworking machines of the type described in the specification of my copending application, Serial No. 849,766, filed July 8, 1914, in which a circular saw is mounted upon a table and is adapted to movement in several directions with respect to said table, and has for its object to increase the scope of work which may be executed by the said woodworker.

A further object is to provide for the attachment of a supplementary table to the said machine, without unduly increasing the number of parts or attachments, and a still further object is to provide in a simple and efficient manner for the sliding of the said table.

A still further object is to provide, where a boring tool, grinder or like attachment is used, for the determination of certain depths of cut which it may be desired to make.

The invention consists essentially of the novel construction and arrangement of the parts whereby a rotatable table pivotally mounted upon said table, an electric motor is mounted upon a carriage which is longitudinally slidable on the rotatable table. Connected to the forward end of the carriage is a housing in which is accommodated a pivoted member, capable of swinging vertically, the forward and free end of the said pivoted member being provided with bearings in which a saw arbor is journaled. The saw arbor carries a saw at one end thereof while the other end of the said arbor is adapted to carry any desirable rotary tool, which may be detachable therefrom. A ripping fence is adjustably secured to the stationary table and is adapted to be used in conjunction with the saw, the said ripping fence being provided with graduations upon its supporting bar for the purpose hereinafter described. A supplementary bar is also detachably secured to the stationary table and a work table is slidably mounted upon the bar of the ripping fence and upon the supplementary bar, but provided with means whereby the same may be rigidly secured in position if so desired, all of which is more particularly described in the following specification and with reference to the accompanying drawing in which,—

Figure 2:
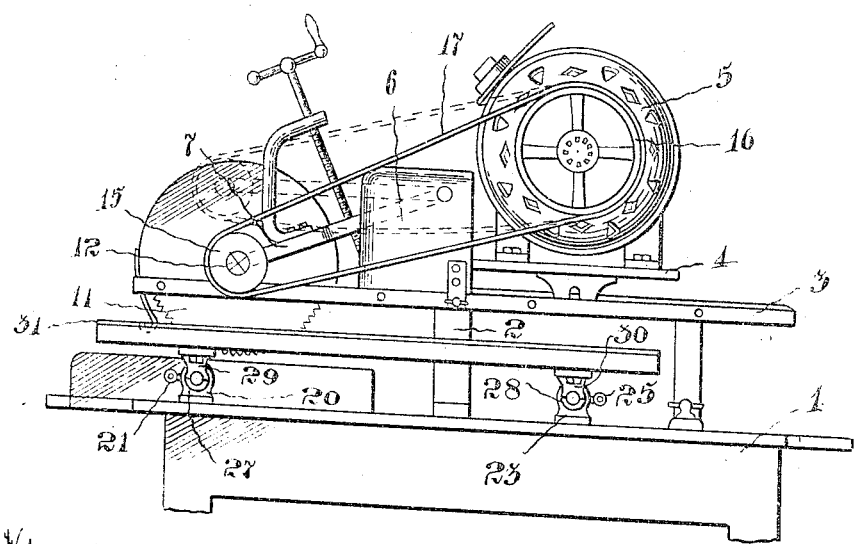
Figure 3:
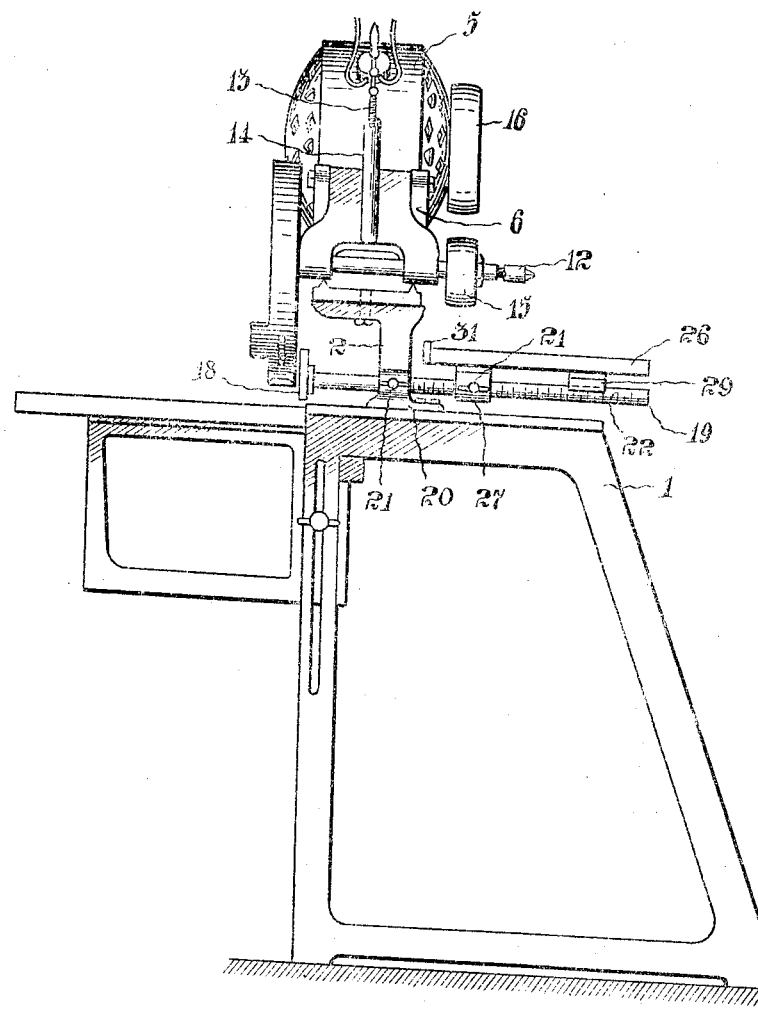

Figure 1 is a perspective view of the improved woodworker. Fig. 2 is an elevation of the same and Fig. 3 is an end elevation of the same.

Similar characters of reference indicate similar parts in the several figures of the drawing.

1 is a stationary table having a support 2 thereon on which a rotatable table 3 is pivotally mounted, a carriage 4 being adapted to slide longitudinally upon the said table 3. The carriage is adapted to carry an electric motor 5, and is provided at its forward end with a housing 6 in which is accommodated a pivoted member 7, forked at its outer and free end and provided with bearings 8, the said pivoted member being capable of swinging vertically upon its pivot 9 in the said housing 6.

10 is a saw arbor journaled in the bearings 8 and carrying at one end the saw 11, the opposite end of the arbor being suitably tapped to accommodate a tool or a chuck 12.

To effect movement of the member 7, a hand screw 13 passes through a correspondingly threaded hole in the pivoted member and bears upon the base of the housing, the said hand screw being intermediately journaled in a handle 14.

15 and 16 are pulleys upon the saw arbor and motor respectively and 17 is the belt transmission from one to the other.

In conjunction with the saw a ripping fence 18 is provided and is supported by a bar 19 at right-angles thereto, said bar passing through a clamp 20 and adjustable therein and a set screw 21 being provided for securing the bar 19 in its adjusted position. In order to determine the position of the ripping fence with respect to the saw, the bar 19 is provided with graduations 22 throughout its length, these graduations serving a further purpose as is hereinafter explained. 23 is a second clamp upon the stationary table in which clamp a supplementary bar 24, parallel to the bar 19 may be secured by means of the set screw 25, this bar 24 being detachable. The bars 19 and 24 are adapted to support a work table 26 having upon its underside clamps 27 and 28 which are slidable upon the said bars, but capable of being secured thereto when necessary. Slides 29 and 30 may also be provided upon the under side of the work table to bear upon the said bars 19 and 24 and eliminate angular strain upon the clamps 27 and 28. A retaining ridge 31 is also arranged along the edge of the work table adjacent to the machine against which the work may be held. By referring to the graduations upon the bar 19, and the relationship of the clamp 27 thereto, the depth of the cut made by the tool 12 when the work is held against the ridge 31 may be ascertained.

It will be understood that the work may be pushed over the table 26 toward the tool, or the work may be stationary upon the table and the table moved in this direction, sliding upon the bars 19 and 24.

Cuts may be made at any position upon the work by sliding the carriage and its attachments along the table 3, and by raising or lowering the pivoted member 7, or by making use of the combination of these two movements.

Where a grinding wheel is used in place of the tool 12, the machine may be drawn backward and forward over the face of the work, the pivoted member being elevated at each movement, until the entire surface of the work has been ground.

When it is desired to swing the rotatable table 3 upon its pivot 2, in order that angular or cross cuts may be made with the saw, the work table 26 and bar 24 are removed thereby permitting the free travel of the said table 3.

As the ripping fence is adapted to form one of the supports of the work table, the complexity of the attachments for this purpose to the machine is reduced to a minimum, and the attachment of the work table to the machine and its detachment therefrom is greatly facilitated. Further, owing to the combination of the tool, with the saw, and its various movements, a great variety of work may be accomplished upon the machine.

This invention may be developed within the scope of the following claims without departing from the essential features thereof, and it is desired that the specification and drawings be read as being merely illustrative and not in a limiting sense, except as necessitated by the prior art.

What I claim as my invention is:

1. In a combination woodworking machine the combination of a circular saw mounted above a stationary table, an arbor upon one end of which said saw is mounted, a rotary tool upon the opposite end of said arbor, a ripping fence, a supporting bar for said fence, adjustably secured to said table, a supplementary bar secured to said table and a work table mounted on said bars.

2. In a combination woodworking machine the construction of a circular saw mounted above a stationary table, an arbor upon one end of which said saw is mounted, a rotary tool upon the opposite end of said arbor, a ripping fence, a supporting bar for said fence, adjustably secured to said table, a detachable supplementary bar secured to said table and a work table mounted on said bars.

3. In a combination woodworking machine the construction of a circular saw mounted above a stationary table, an arbor upon one end of which said saw is mounted, a rotary tool upon the opposite end of said arbor, a ripping fence, a supporting bar for said fence, adjustably secured to said table, a supplementary bar secured to said table and a slidable work table mounted on said bars.

4. In a combination woodworking machine the construction of a circular saw mounted above a stationary table, an arbor upon one end of which said saw is mounted, a rotary tool upon the opposite end of said arbor, a ripping fence, a graduated supporting bar for said fence, secured to said table, a supplementary bar secured to said table, a work table slidably mounted on said bars and means associated with said work table, serving as an indicator on said graduations.

5. In a combination woodworking machine, a stationary table, a circular saw mounted above said stationary table, a longitudinally slidable carriage mounted on said table, an electric motor mounted on said longitudinally slidable carriage and adapted to drive said circular saw, an arbor upon one end of which said circular saw is mounted, a rotary tool upon the opposite end of said arbor, a ripping fence, a supporting bar for said fence, adjustably secured to said table, a supplemental bar secured to said table and a work table mounted on said bars, substantially as described.

Signed at Toronto, in the county of York, in the Province of Ontario, in the Dominion of Canada, this 30th day of June, 1914.

WILLIAM ALBERT ELLIOT.

Witnesses:
STANLEY LIGHTFOOT,
C. CHESWRIGHT.